(12) United States Patent
Hohl et al.

(10) Patent No.: US 8,904,656 B2
(45) Date of Patent: Dec. 9, 2014

(54) GONIOMETER WITH GRAPHIC INFORMATION DISPLAY MEANS FOR PROVIDING INFORMATION

(71) Applicant: Vectronix AG, Heerbrugg (CH)

(72) Inventors: Reto Hohl, Balgach (CH); Simon Hegetschweiler, Rebstein (CH); Felix Wälti, Widnau (CH)

(73) Assignee: Vectronix AG (CH)

( * ) Notice: Subject to any disclaimer, the term of this patent is extended or adjusted under 35 U.S.C. 154(b) by 188 days.

(21) Appl. No.: 13/646,344

(22) Filed: Oct. 5, 2012

(65) Prior Publication Data

US 2013/0091719 A1 Apr. 18, 2013

(30) Foreign Application Priority Data

Oct. 6, 2011 (EP) .................. EP11184194

(51) Int. Cl.
| | | |
|---|---|---|
| *G01C 15/00* | (2006.01) | |
| *G01C 1/00* | (2006.01) | |
| *G01C 19/38* | (2006.01) | |
| *G01B 5/24* | (2006.01) | |

(52) U.S. Cl.
CPC *G01B 5/24* (2013.01); *G01C 15/00* (2013.01); *G01C 1/00* (2013.01); *G01C 19/38* (2013.01)
USPC .......................................... 33/281

(58) Field of Classification Search
USPC ................. 33/281, 282, 285, 290–296
See application file for complete search history.

(56) References Cited

U.S. PATENT DOCUMENTS

| | | | | |
|---|---|---|---|---|
| 4,653,910 A | * | 3/1987 | Poling ........................ | 33/294 |
| 5,272,922 A |   | 12/1993 | Watson | |
| 5,402,223 A | * | 3/1995 | Schlobohm et al. ........... | 33/293 |
| 6,166,802 A | * | 12/2000 | Kodaira et al. ............... | 33/293 |
| 7,266,898 B2 | * | 9/2007 | El-Katcha et al. ............. | 33/293 |
| 7,444,760 B2 | * | 11/2008 | Hoffmann et al. ............ | 33/291 |
| 2006/0021235 A1 | * | 2/2006 | Becker ........................ | 33/282 |
| 2007/0130785 A1 | * | 6/2007 | Bublitz et al. ............... | 33/290 |
| 2009/0119050 A1 | * | 5/2009 | Hayashi ...................... | 702/94 |
| 2009/0235543 A1 | * | 9/2009 | Hayashi et al. ............... | 33/293 |
| 2012/0272536 A1 | * | 11/2012 | Nishita ........................ | 33/290 |
| 2014/0075767 A1 | * | 3/2014 | Frank et al. ................... | 33/290 |

FOREIGN PATENT DOCUMENTS

| | | |
|---|---|---|
| DE | 3141405 | 5/1983 |
| DE | 20215235 | 1/2003 |
| DE | 102005017320 | 11/2005 |
| EP | 0250608 | 1/1988 |
| EP | 1744196 | 1/2007 |
| EP | 2138885 | 12/2009 |
| EP | 2239540 | 10/2010 |
| JP | 9101152 | 4/1997 |

* cited by examiner

*Primary Examiner* — G. Bradley Bennett
(74) *Attorney, Agent, or Firm* — Muncy, Geissler, Olds & Lowe, P.C.

(57) ABSTRACT

A goniometer has a base defining a standing axis, a structure rotatable around the standing axis relative to the base, an angle encoder, and a control and processing unit. The structure has a graphic electronic information display arrangement having at least two display zones for displaying user guidance information and/or measuring information, a first of the at least two display zones being arranged in a first radial alignment relative to the standing axis on the structure. A second of the at least two display zones of the information display means is arranged in a second radial alignment relative to the standing axis on the structure, the first radial alignment and the second radial alignment enclosing an angle of at least 90°. The at least two display zones are automatically individually activated by the control and processing unit as a function of a fulfillment of a stored angular position criterion.

15 Claims, 4 Drawing Sheets

GONIOMETER WITH GRAPHIC INFORMATION DISPLAY MEANS FOR PROVIDING INFORMATION

This application claims priority to European Patent Application No.: 11184194.6, which was filed in Europe on Oct. 6, 2011, and which are both herein incorporated by reference in their entirety.

BACKGROUND OF THE INVENTION

1. Field of the Invention

The invention relates to a goniometer, a system made of goniometer and observation device, and an initialization method for a goniometer.

2. Description of the Background Art

"Goniometer" designates a device, using which, on the one hand, angles are measurable and, on the other hand, the rotation of an object to a precise angle position can be carried out. The word "goniometer" is a composite term derived from the Greek words "gonio" (=angle) and "metron" (=to measure). Goniometer refers—as currently understood—to a device for the precise rotation of an object (observation device) around a fixed axis and a measurement of the angle assigned to the respective rotation. Goniometers are used in particular in conjunction with high-performance observation devices for military or geodetic purposes. It is important that the systems are handy, fast and simple to operate and as compact and light as possible. Goniometers are no be understood in the scope of the following description and therefore the present invention as robust devices, conceived for use in the field, in particular for determining azimuth angles of attached devices.

A tripod with tripod attachment is mentioned in this regard as a possible embodiment of a goniometer, whose vertical rotational axis (also designated as the standing axis in surveying) has an angle measurement which can be referenced to north. Various observation devices, for example, binoculars, monoculars, cameras, rangefinders, night vision devices, small weapons systems, etc., can be installed thereon. For example, these types of currently available observation devices can have—in addition to a daylight observation function—the following as further functions: target marking for military applications or for hunting purposes, integrated rangefinders and direction finders, an electronic display screen for providing information—in particular a display screen image being able to be overlaid with the daylight vision image, a night vision function, etc. It is thus possible, for example, to provide an image from a camera, location information in the form of a map, for example, measured distances or directions, stored information with respect to a target object being aimed at—e.g., vulnerability points of an enemy tank—or temperature and weather information to the user on the basis of the electronic display screen. In particular, these devices are often designed in the form of binoculars or field glasses, having the mentioned special functions for respective special usage purposes.

Information can be transmitted and linked between the devices, i.e., goniometer and observation device attached thereon, through corresponding data interfaces and, for example, a north-referenced azimuth alignment, which can be determined by means of sensors available in the device, can be used jointly with an elevation measurement and a distance measurement to determine target coordinates. The azimuth angle can be measured, e.g., by means of an angle encoder, which measures a respective angular position of a fixed base relative to a structure rotatable to the base. Furthermore, an elevation angle can be determined by a second angle encoder, which is arranged on a swivel joint on the structure, for example, or using an inclination sensor in the observation device. Furthermore, if the device location is known, for example, via GNSS (global navigation satellite system), e.g., GPS or Galileo, target coordinates can also be determined in a cartographic coordinate system.

For example, a magnetic compass alignment can be used to determine a north alignment of the goniometer. Especially in inside rooms of buildings, steel structures, tunnels, or in underground installations, and close to electrical facilities, however, a sufficiently precise magnetic compass measurement is often impossible. In particular, the material selection for the construction of a corresponding measuring device is restricted to those materials which are amagnetic and therefore do not influence the north determination.

For example, an observation device having a tripod implemented from amagnetic material for aiming at a target using a laser rangefinder and a digital magnetic compass is known from DE 10 2005 017 320 A1. The alignment of the arrangement relative to the north direction is determined here by means of the magnetic compass, which has three device-fixed magnetic field sensors.

In addition to finding north magnetically, finding north by determining the earth's rotational axis, which connects the geographic north pole and south pole by definition is also known. This principle has been known since the first construction of a Foucault's pendulum by John Bernard Léon Foucault in the year 1851.

The determination of the earth's rotational axis became technically usable above all by refinements in the field of gyroscopic sensors, beginning with spinning gyroscopes via laser ring gyroscopes and fibre gyroscopes up to the current MEMS gyroscopes (e.g., vibration gyroscope) which make a north determination able to be performed, for example, according to the HRG, principle (=hemispherical resonator gyroscope) or other known technologies. In contrast to the use of magnetic sensors, through the use of yaw rate sensors to determine north, for example, the tripod for an observation device or the goniometer, respectively, can also be manufactured from materials which have magnetic properties.

In this context, U.S. Pat. No. 5,272,922 discloses a gyroscope combined with a protractor for determining the geographic north pole, such a device being able to be used according to the disclosure in mining, surveying, or for target acquisition. Through this combination, the north direction can be specified as a reference and the angles determined by the protractor can be specified in relation to north.

To determine the geographic north pole relative to the base of the goniometer, for example, a simultaneous measurement can be performed using at least two gyroscopes arranged at an azimuth angle to one another or using only one single-axis gyroscopic sensor (yaw rate sensor), in general at least two measurements having to be performed in respectively different azimuth angular positions of a rotational axis of the sensor (relative to the base) using only one sensor.

For this purpose, EP 2 239 540 A1 proposes a gyroscope for use with a goniometer, the goniometer having an angle measuring sensor for determining the azimuth angular position. The gyroscope is provided to ascertain the north direction by means of two measurements in respectively one of two angular positions of the goniometer.

For high precision in the determination of a north direction from two measurements, is advantageous so set a defined relative angular position between the two measured positions, in which the influences on the sensor with the respective measurement can be ascertained as independently as possible and therefore precise determination of north can be performed. In this context, e.g., a first alignment of the structure and a second alignment relative to the first at an angle of, e.g., 90° or 120° are suitable, one measurement being performed by the gyroscope provided in the structure in each alignment. Since goniometers are typically provided in a robust embodiment without motorization, pivoting from the first angular position to the second angular position can be performed manually.

To achieve the respective, in particular advantageous angular position, a user can perform a respective required pivot of the structure relative to the base with the aid of information output on the device. It can be disadvantageous that graphically displayed information is at least partially concealed or can be moved out of the field of vision of the user upon pivoting of the structure into the respective measuring position, and therefore is not continuously available to the user until reaching the measuring position. Furthermore, it is disadvantageous that upon a corresponding rotation, the luminescent display changes its alignment so that it can be perceived by an enemy in direct line of sight and therefore a location of the goniometer is more easily recognizable. By arranging a display on the base (and therefore a fixed relative position to the base) of the goniometer, for example, the user could have the information continuously provided in one direction, however, it is disadvantageous in this case that the integration of the display in the base places a requirement on the installation space necessary for this purpose, which is to be avoided with respect to a compact device construction.

It is therefore an object of the present invention to provide an improved goniometer for providing defined and referenced azimuth angles, the device being designed for user-friendly, compact information output, which is particularly continuously perceptible to a user.

A further object of the invention is to provide an improved goniometer, which is equipped with an information output for robust, rapid, precise referencing of the device, which can be performed with high user-friendliness.

In addition, it is an object of the invention to provide information for initializing a goniometer so that during an initialization procedure of the goniometer, a direct visual connection between a graphic information output and an enemy is avoided.

A special object of the invention is to provide an improved goniometer with the capability of simpler and more user-friendly finding of north.

These objects are achieved by the implementation of the characterizing features of the independent claims. Features which refine the invention in an alternative or advantageous manner can be inferred from the dependent patent claims.

SUMMARY OF THE INVENTION

The invention relates to a goniometer having at least one base, which defines a standing axis, a structure, the structure being rotatable around the standing axis relative to the base, an angle encoder for determining an angular position of the structure relative to the base, and a control and processing unit. An angle value to be acquired by an angle encoder or angle coder of a goniometer according to the invention can be determined magnetically, capacitively, or optically. For example, for an optical determination of an existing angular position value, a code disc can be illuminated in such a manner that a pattern is projected onto a sensor and a respective pattern can be unambiguously assigned to an angular position or incremental angular position change. The pattern is acquired using the sensor and an angle value is derived therefrom. The code disc can be assigned to the base and the sensor can be assigned to the structure (or vice versa).

According to the invention, the structure has a graphic electronic information display means having at least two display zones for displaying user guidance information and/or measuring information, a first of the at least two display zones of the information display means being arranged in a first radial alignment relative to the standing axis on the structure.

A second of the at least two display zones of the information display means is arranged in a second radial alignment, which is different from the first radial alignment, relative to the standing axis on the structure, the first radial alignment and the second radial alignment enclosing an angle of at least 90°. In addition, the at least two display zones are automatically individually activated by the control and processing unit as a function of a fulfillment of a stored angular position criterion by a current angular position.

The goniometer according to the invention therefore provides the capability of being able to precisely measure an azimuth angle of the structure relative to the base by means of the provided angle coder. In addition, information is provided which, e.g., is used by a user of the goniometer to set a required angular position on the device and can therefore be employed for user guidance. The information is output for this purpose on at least two, in particular three display zones of the information display means, these zones or display screens each being able to be arranged on different sides of the structure and therefore the information being visible from different directions. In addition, through the arrangement on the structure, the information displays are correspondingly co-rotated upon the rotation or pivoting of the structure relative to the base, whereby a user can maintain a fixed location and, e.g., in the event of a rotation of the structure by 90°, can first infer the information from the first display zone and, after this zone has been pivoted out of his field of vision, can infer information from the second display zone. Approaching specific angular positions is thus possible in a user-friendly manner without changing a position of the user.

Furthermore, the individual display zones are activated as a function of the angular position criterion. In this context, the angular position criterion can be a decision rule, according to which the control and analysis unit performs the activation of the display zones. E.g., a value for the angular position of the structure relative to the base can be defined, exceeding the value (upon a rotation of the structure) resulting in the shutdown of individual display zones or the non-display of user information on a display. This shutdown—or dimming—of the display is carried out by means of the control and analysis unit. In general, a comparison is therefore carried out of whether the predefined criterion is fulfilled, and a control of the display zones is performed based thereon. A current angular position can be continuously compared to the defined angle criterion.

In particular, according to the invention, at least one of the display zones can be turned on or off upon fulfilling the angular position criterion. Thus, for example, the display zones which fulfill the criterion with respect to their radial alignment (in relation to the standing axis) can be activated or deactivated. E.g., the displays, whose display directions are within an angle range predefined by the angular position criterion, can be turned off or deactivated. The angle range can be defined solely in relation to the standing axis (e.g., perpendicularly thereto), a "piece of cake" of a cylinder being spanned by this definition and the display directions which at least intersect this segment being able to be activated differently by the control and analysis unit.

Furthermore, according to the invention, upon a startup of an initialization method, a user angle range and/or an aiming angle range can be defined by an angular position of the structure relative to the base present upon starting, only the display zones, whose radial alignments lie within the user angle range, displaying the user guidance information and/or at least one of the display zones being turned on or off in a manner controlled by the control and analysis unit as a function of a comparison of a current angular position of the structure to the aiming angle range.

Through such user angle ranges and aiming angle ranges, sectors can respectively be defined in a measuring environment, in which graphic provision of information is desired or in which such a display is not to be performed. For example, luminescent displays in the direction of an enemy are undesirable, so that a recognizability of the device location on the part of the enemy can be kept as small as possible. In an aiming angle range corresponding thereto, all display zones can accordingly be turned off, automatically controlled by means of the control and analysis unit, or can be turned off automatically upon reaching or entering the range (upon pivoting of the structure relative to the base).

In particular, the user angle range can be assigned to a direction or a current location which a user of the goniometer preferably occupies to operate the device. In this context, the angular position criterion can predefine an activation and information output on the display zones whose radial alignments lie within the user angle range. A respective individual, activation of the zones can again be performed.

The control of the display zones can particularly be performed based on a continuing, in particular continuous comparison of the currently provided angular position of the structure relative to the base using the angular position criterion. E.g., the current setpoint and therefore the respective current radial alignments of the at least two display zones can be compared to an aiming angle range or user angle range, which is defined in the scope of the angular position criterion, and a control command with respect to the information provision can be generated from the comparison.

In addition, according to the invention at least one of the display zones can be turned off, in a manner controlled by the control and analysis unit, upon exceeding a respective angle threshold value assigned to the radial alignment of the at least one display zone, which occurs due to a change of the angular position of the structure. By establishing such angle threshold values, in particular respectively one threshold value for each display zone, an angle value can be continuously ascertained by means of the angle encoder and this value can be compared to the respective threshold values. The display zones whose assigned angle threshold value is exceeded by a current angular position or will be exceeded during a rotation of the structure, respectively, can therefore—again controlled by the control and analysis unit—be turned off or can be turned off upon exceeding the threshold value, respectively. By means of such a control of the displays, a direct visual connection between an illuminated display and an object to be targeted, e.g., an enemy position, can also be avoided and therefore exposure of the device location (e.g., to the enemy) by recognizing the display can be prevented.

Furthermore, the structure of the goniometer can have an at least partially polygonal footprint according to the invention and the at least two display zones can respectively be arranged on a face of the structure which connects two corners. According to the invention, the structure can alternatively or additionally have an at least partially elliptical, in particular round footprint and the at least two display zones can be arranged on an outer lateral surface of the structure corresponding to the elliptical footprint.

The housing of the structure of the goniometer can therefore be provided in a partially elliptical and/or polygonal embodiment, the footprint of the structure and, corresponding thereto, the outer lateral surfaces of the structure being able to simultaneously have elliptical and polygonal partial segments. The display zones of the information display means can therefore be arranged on different lateral faces of the housing depending on the embodiment of the structure.

In this special embodiment, the information display means can be implemented according to the invention in a dimensioning enclosing the structure along the outer lateral surface of the structure, in particular in a ring shape. The structure of the goniometer can, e.g., be enclosed by the information display means so that information can be displayed in a plurality of radial directions. In this case, the information display means or a corresponding plurality of display zones of the information display means, respectively, can be activated so that the displayed information is output continuously in a substantially fixed, absolute direction relative to the base of the goniometer. During a rotation of the structure and therefore the information display means, the information display can therefore "travel along" the display and thus provide the impression of a display which is fixed relative to the base, although the display is rotated with the structure.

With regard to a further aspect of the invention, the goniometer can additionally have a third display zone according to the invention, a user side being defined by the arrangement of the first display zone in the first radial alignment on the structure and the second and third display zones each being arranged on the structure offset by at least 90° to the first display zone, in particular offset by 120°.

In this embodiment, of the goniometer according to the invention, three displays are accordingly arranged so that the user side is definable so that main operating elements of the device can be assigned to this side and this side points in the direction of a user, in particular during setup of the device. Upon a rotation of the structure relative to the base, the display zones can further be placed on the structure so that at least one display zone is continuously perceptible by the user. In this embodiment, a changeover of the information output can in turn occur, so that all three displays do not provide information, but rather only one or two of the three display zones are activated depending on the angular position of the structure, preferably the ones which lie in the field of vision of the user.

In particular the number and the respective radial alignments of the display zones on the structure of the goniometer can be selected according to a number of required measurements (e.g., for initialization) or measuring positions provided for this purpose, respectively. Thus, for example, if three different measuring positions of the structure are provided for an initialization of the goniometer, an angle of 120° respectively being predefined between two measuring positions, three display zones can be arranged on the structure so that the radial alignments of each two (adjacent) zones respectively enclose a 120° angle. Accordingly, with four angular positions to be set (in the scope of an initialization procedure), four display zones can be provided on the structure, the radial alignments of each two adjacent zones enclosing a 90° angle.

According to the invention, the structure of the goniometer can have a swivel joint which defines an elevation inclination axis, the inclination axis being perpendicular to the standing axis, in particular the swivel joint being assigned a further angle encoder for determining an inclination angle.

With this swivel joint, a second axis is available so the goniometer, around which pivoting in elevation can be performed. If an azimuth angle can be set and determined by means of the standing axis, elevation angles can be set by the inclination axis and are particularly measurable by means of an angle encoder on the swivel joint or an inclination sensor integrated in the observation device. An alignment of a device, which is arranged on the goniometer and rotatable around the two axes, can thus be precisely determined in two axes. This embodiment is advantageous in particular an observation device is fastened on the structure.

As is known to a person skilled in the art and typical for goniometers, the structure can additionally have a receptacle for fastening an observation device. The receptacle of the observation device is implemented by a fixed position and/or angle relation of the observation device to the structure. The observation device is accordingly also pivoted upon pivoting of the structure, an azimuth angle for the observation device also being able to be determined simultaneously. In addition—in an embodiment of the goniometer with an additional swivel joint and an additional angle encoder—an elevation angle can be determined and therefore the alignment of the observation device in two directions can be determined.

Instead of the observation device, other devices can also be fastened on the structure, in particular by means of the receptacle. For these further devices, e.g., small weapons systems, respective azimuth and elevation angles and in particular an aiming alignment can be determined similarly.

The invention additionally relates to a system made of a goniometer and an observation device, the goniometer being implemented according to one of the above-described embodiments. The second system component comprises the observation device, which is placed on the structure in a defined position and angle relationship, for targeting a target. The observation device is also pivotable around the standing axis and in particular an inclination axis and has a distance measuring functionality, in particular the observation device being fastenable modularly on the structure.

Furthermore, the system has a graphic electronic information display means having at least two display zones for displaying user guidance information and/or measuring information, a first of the at least two display zones of the information display means being arranged in a first radial alignment relative to the standing axis on the structure or on the observation device. A second of the at least two display zones of the information display means is arranged in a second radial alignment, which is different from the first radial alignment, relative to the standing axis on the structure or on the observation device, the first radial alignment and the second radial alignment enclosing an angle of at least 90°. In addition, the at least two display zones are automatically individually activated by a control and processing unit as a function of a fulfillment of a stored annular position criterion by a current angular position.

In particular, the goniometer of the system can be refined in the scope of the invention according to one of the above-described embodiments.

The observation device can additionally be equipped, in addition to a rangefinder, for example, with an electronic display screen for loading auxiliary information, e.g., distance to a target, azimuth and elevation angles, or weather data, in the viewing channel. In addition, at least one inclination sensor can be provided on this device, so that an elevation angle can be determined—independently of an angle encoder assigned to the swivel joint. These devices can essentially be used in the military field or in the hunting field. E.g., a generic observation device is known from EP 2 138 835 A1.

A further aspect of the invention relates to an initialization method for alignment determination of a goniometer. The goniometer has a base which defines a standing axis and a structure which is rotatable around the standing axis relative to the base. In addition, setup and coarse horizontal levelling of the goniometer, determination of an angular position of the structure relative to the base, and graphic display of user guidance information are performed. A user angle range is defined upon a startup of the initialization method or by a defined alignment of the base. In addition, the alignment determination is performed by at least two alignment measurements in at least two different initialization angular positions of the structure relative to the base. To reach the respective initialization angular positions, the graphic display of the user guidance information is performed in at least two radial alignments automatically controlled in such a manner that the user guidance information is only displayed in the radial alignments whose directions lie within the user angle range. The at least two radial alignments enclose an angle of at least 90°.

In particular, according to the invention a north direction can be derived by means of the at least two alignment measurements. In addition, during the initialization method, the alignment measurements can be performed in three initialization angular positions and a quality value for the derived north direction and in particular additionally the zero point error of a gyroscope used in a sensor provided for this purpose can be determined.

After a setup of a goniometer at a location, an initialization of the device can be carried out for the provision of a precise relative azimuth angle determination. For this purpose, according to the invention, at least two measurements are carried out using respectively different alignments of the goniometer and an alignment is determined from a joint observation of the two measurement results, in particular a north direction being ascertained and a relative angular position of the base or the structure of the goniometer thereto being derived. For each subsequently performed alignment measurement using the initialized goniometer, a direction to a target can therefore be determined. If the location of the goniometer is additionally known, e.g., from a GPS position determination, an exact absolute position of the target can be determined by means of an additional distance measurement.

The device according to the invention, the system according to the invention, and the method according to the invention will be described in greater detail hereafter, solely for exemplary purposes, on the basis of specific exemplary embodiments which are schematically shown in the drawings, further advantages of the invention also being discussed. In the figures:

BRIEF DESCRIPTION OF THE DRAWINGS

FIGS. 2b-c each show an enlarged view of the display zones associated with the goniometer according to the invention according to FIG. 2a;

DETAILED DESCRIPTION

Figure 1:
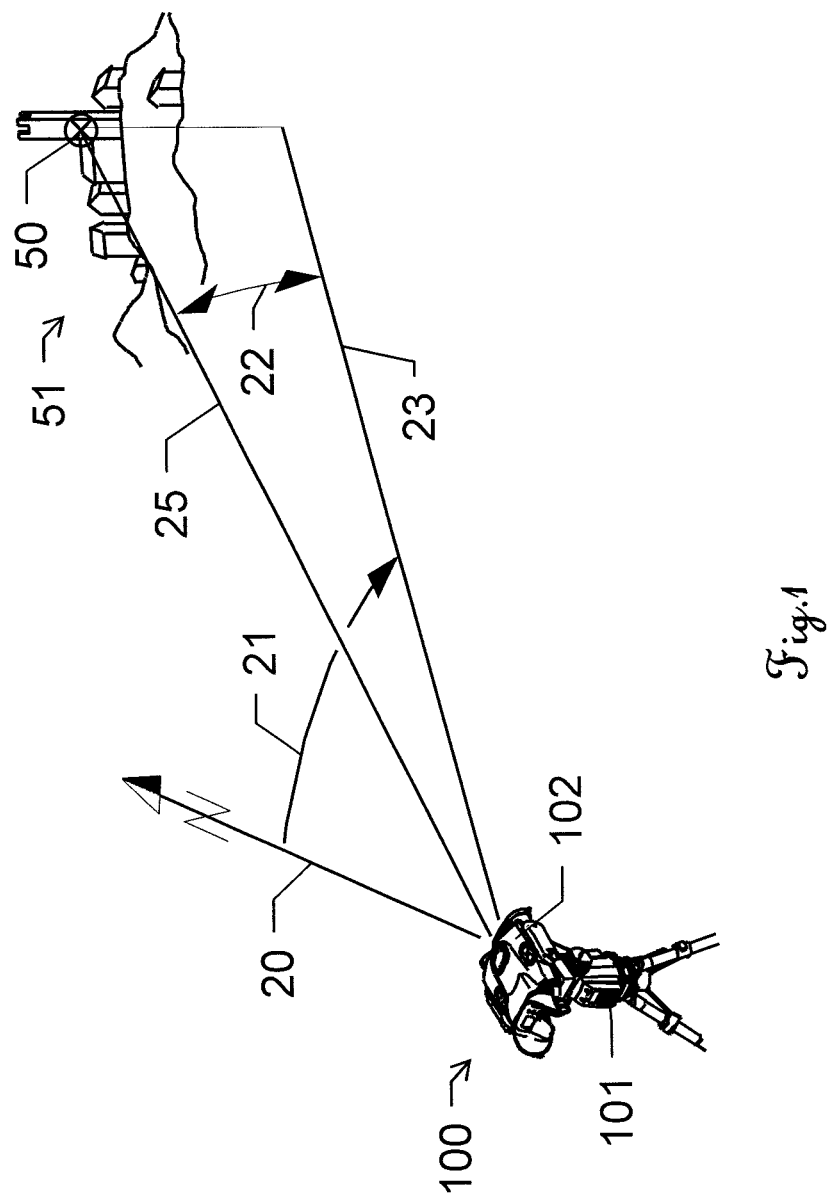
FIG. 1 shows a goniometer having an observation device and tripod according to the prior art.

FIG. 1 shows a combined measuring device 100 according to the prior art having a goniometer 101 and an observation device 102. Such measuring devices 100 are used in particular in the military field as observation or aiming instruments or to assist in hunting. Depending on the field of use and requirement for the respective measuring situation, the observation device 102 can be provided in an adapted embodiment, e.g., equipped with a night vision module. In this context, EP 1 744 196 A1 proposes different embodiments for a generic observation device.

In the present exemplary embodiment, a determined north direction is shown by the arrow 20, the determination of this direction having been carried out, e.g., by means of a magnetometer or with the aid of yaw rate sensors. Furthermore, a target scenario 51 is observed using the observation device 102 and a target point 50 is aimed at in this scenario 51. The aiming at the target point 50 and a distance measurement to this point 50 are performed here by means of a laser beam 25 emitted by the observation device 102 in the target point direction. The goniometer also has an angle measuring sensor, using which an angular position of the structure relative to the fixed base of the goniometer is measurable in the azimuthal direction and therefore an azimuth angle 21 between the north direction and the aiming direction can be determined. In addition, the measuring device 100 has an angle determination means for determining the elevation angle 22, e.g., an inclination sensor associated with the observation device 102 or a second angle measuring sensor for measuring a pitch angle between the goniometer 101 and the observation device 102. The elevation angle 22 therefore represents the angle 22 between the aiming direction and a horizontal 23 having an absolute elevation angle of 0°.

Figure 2A:
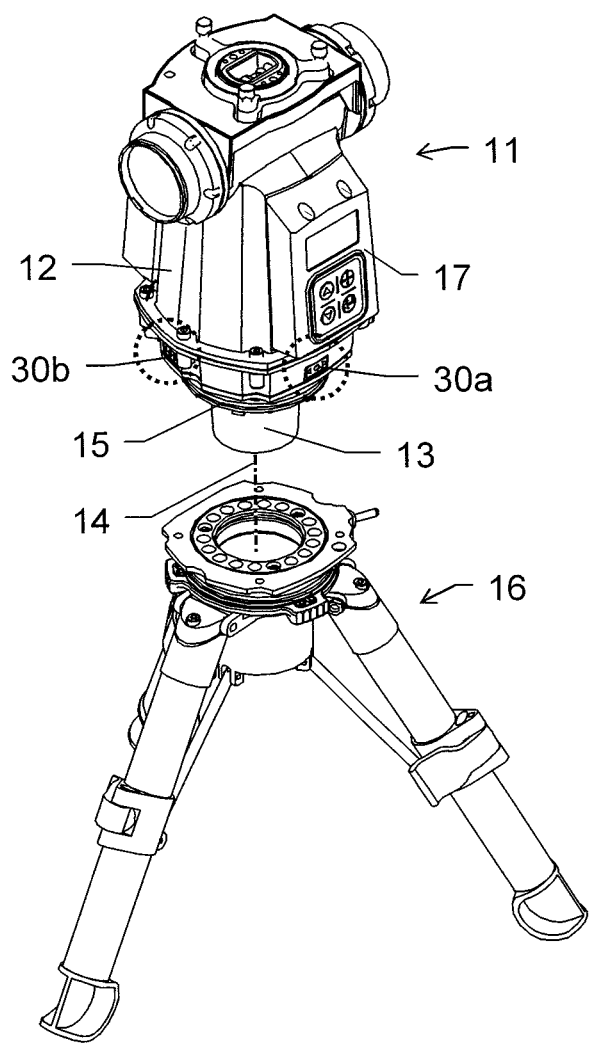
FIG. 2a shows a goniometer according to the invention having a tripod.

FIG. 2a shows an embodiment of a goniometer 11 according to the invention having a tripod 16 capable of receiving a base 13 of the goniometer 11. The base 13 is connected to a structure 12 so it is rotatable around a standing axis 14, an angle encoder 15—between base 13 and structure 12—additionally being provided for the precise determination of an angular position of the structure 12 relative to the base 13.

Furthermore, the goniometer 11 has a gyroscope (not shown) for finding north in the present embodiment. According to the invention, the structure 12 also has two display zones 30a, 30b (each marked by means of a dashed circle for illustration), the display zones 30a, 30b being able to provide information with respect to an angular position to be set. The two display zones 30a, 30b are aligned with a relative radial alignment of at least 90° difference to one another, i.e., the radial alignments of the two display zones 30a, 30b enclose an angle of at least 90°.

During an initialization procedure for the goniometer 11, the gyroscope can be used for finding north and therefore for referencing of the device 11. At least two, in particular three measurements using the gyroscope in respectively different angular positions of the structure 12 relative so the base 13 can be advantageous for the initialization in this case. Such an initialization procedure and measuring means used for this purpose on the part of the goniometer 11 are described, for example, in European Patent Application EP 11184130.5. In particular, in a typical application, the device 11 can be set up with the aid of the tripod at a setup point and aligned in an observation direction. During such alignment, a user interface 17 is aligned in the opposite direction to the observation direction and can thus be well recognizable for a user.

With startup of the initialization procedure, a first gyroscopic measurement in this first alignment can then be carried out. After completed first measurement, the goniometer 11 can then be rotated into a second alignment to carry out a second measurement in a second gyroscope alignment. Depending on the embodiment of the goniometer 11 or a respective north determination method, a further third measurement in a third alignment or still further measurements can be performed. To reach the respective second, third, or further angular position, the display zones 30a, 30b according to the invention provide the information about the direction in which a rotation is to be performed and when the second or further angular position predefined by the device 11 is reached. Through the rotation of the structure 12 into different angular positions, the display zones 30a, 30b are simultaneously also pivoted, whereby the information, which is displayed by means of the first display zone 30a facing towards the user after the setup of the device 11, can be pivoted out of the field of vision of the user or concealed by the pivoting, respectively. In addition to a display of information provided to reach a specific angular position, measuring information, e.g., a remaining measuring time, can additionally be displayed by means of the display zones 30a, 30b.

During this pivoting, according to the invention, the information display means or the display zones 30a, 30b, respectively, are activated as a function of the angular position of the structure 12 relative to the base 13. Thus, the activation can be performed in such a manner that always only the display zones 30a, 30b which are located in the field of vision of the user provide information, i.e., are activated. The field, of vision of the user covered by an alignment of the structure 12 can be defined by the alignment of the base 13 existing upon startup of the initialization process in addition, in the scope of the angle-dependent control of the display zones 30a, 30b, the zones whose radial alignment is in a defined observation range can be turned off. The observation range can also be established with the setup of the device 11 or with the startup of the initialization procedure, respectively, by the orientation of the base 13.

In a further embodiment of the goniometer 11, three display zones can be arranged on the structure 12 of the goniometer 11, these each being arranged offset to one another by at least 90° with respect to their radial alignment, in particular a 120° angle essentially existing between the alignment of each two display zones.

Figure 2B:
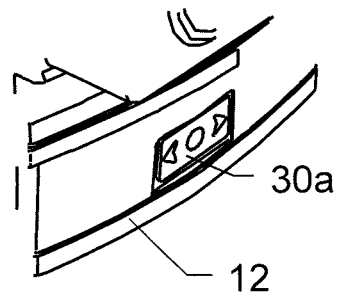
Figure 2C:
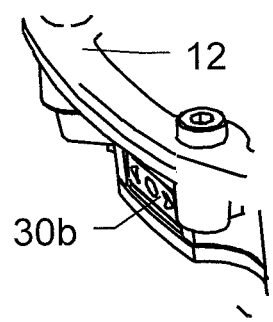

FIGS. 2b and 2c each show an enlarged view of one of the display zones 30a, 30b, which is indicated in FIG. 2a by the dashed circles and is arranged on the structure 12 of the goniometer 11 according to the invention.

Figures 3A, 3B:
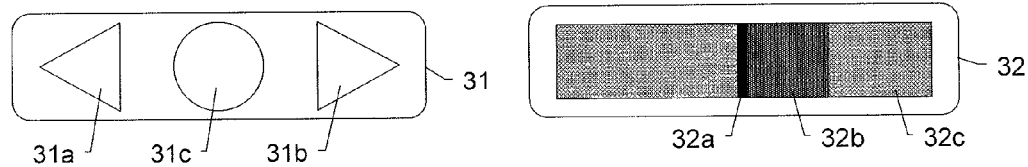
FIGS. 3a-b each show an embodiment of a display zone for a goniometer according to the invention.

FIGS. 3a and 3b each show an embodiment of the display zones 31, 32 associated with the goniometer according to the invention. In FIG. 3a, a display zone 31 which can be associated with a goniometer according to the invention is shown, this zone having two direction-specifying arrow symbols 31a, 31b and a round symbol 31c which can be illuminated. In particular when guiding a user through the initialization process of the goniometer, a direction, in which the goniometer must be rotated to reach the next measuring angle position, can be indicated to the user by means of illuminating one of the arrow symbols 31a, 31b. If the alignment predefined by the system is then reached upon a corresponding rotation of the device, instead of the respective direction-indicating arrow 31a, 31b, the round symbol 31c is illuminated, and it is thus signalled that the suitable angular position is reached.

FIG. 3b shows an alternative embodiment of the display zone 32. In this context, a bar 32b is displayed on the display, which indicates a rotational direction by its alignment relative to a middle 32a of a display region 32c. The still remaining angle change until reaching the predefined measuring angle position is indicated by the size of the bar 32b. The bar size is adapted continuously depending on the angular position. If a predefined angular position is reached, for example, the entire display region 32c or only the middle 32a of the region 32c can be illuminated for signalling purposes, for example.

Figure 4:
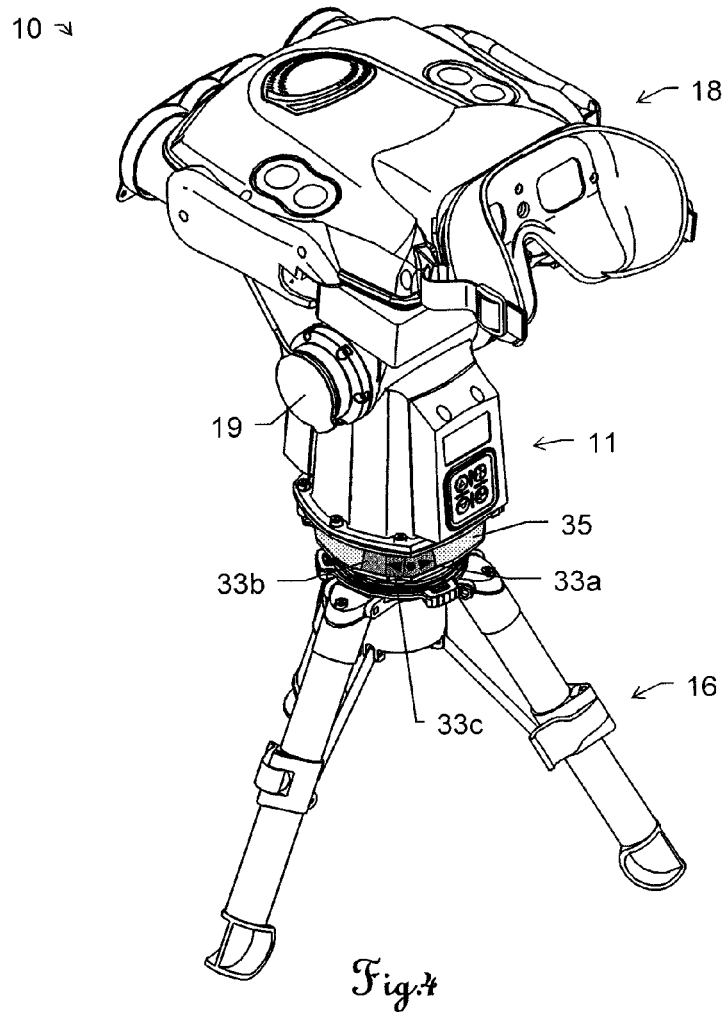
FIG. 4 shows a further embodiment of a goniometer according to the invention having an observation device.

FIG. 4 shows an embodiment of a goniometer 11 according to the invention having an observation device 18 (system made of goniometer and observation device) and tripod 16. The base of the goniometer 11 is connected in a fixed alignment to the tripod 16 in such a manner that the orientation of the base relative to the tripod 16 is maintained. The structure of the goniometer 11 is again rotatable around the standing axis relative to the base, the respective angular position of structure to base being able to be determined by means of an angle encoder. Through a rotation of the goniometer 11, the observation device 18 is also pivoted in accordance with the rotation. The alignment of the observation device 18 can therefore also be determined by means of the angle encoder. In addition, the observation device 18 can be inclined around an inclination axis perpendicular to the standing axis via a swivel joint 19 of the goniometer 11. To determine an existing inclination angle, for example, the observation device 18 can have at least one inclination sensor or a further angle encoder for measuring a swivel joint angle can be associated with the swivel joint 19. A current elevation angle for an alignment of the observation device 18 can be ascertained from the determination of the inclination angle—after a preceding referencing of the observation device 18 relative to a horizontal. Furthermore, the observation device 18 has a rangefinder (not shown) for measuring distances to targets.

Using the system 10 shown made of goniometer 11 according to the invention and observation device 18 having tripod 16, an exact alignment of the observation device 18, an aiming direction defined by the observation device 18, and a distance to a target point can therefore be exactly determined. This determination can provide a relative position of a target to a location of the system 10. If the setup point of the device combination 10 is additionally known, in particular in coordinates, an absolute position can thus be calculated for the target point. The analysis of the ascertained measured data can be performed, for example, on a control, and analysis unit on the goniometer 11, on the observation device 18, or by means of an external unit, a data transmission being provided between the individual system components—also with the external unit.

According to the invention, the goniometer 11 has an information display means. In the present system, this information display means is implemented as a display screen 35 so that the display screen 35 has a shape corresponding to the housing of the structure of the goniometer 11. The display screen 35 therefore encloses the entire structure or is arranged on the outer lateral surface of the structure, respectively, so that information can be displayed by means of the display screen 35 in all radial directions relative to the standing axis. The information is displayed here in a display zone 33a, the display of the information being controllable as a function of the angular position of the structure relative to the base.

The information can therefore be displayed continuously offset along the display screen 35 during a rotation of the structure, i.e., during a rotation by a specific angle, the display of information can be provided in a display zone 33b following the current display zone 33a, these zones being able to overlap in an overlap region 33c with respect to the respective extension on the display screen 35. In particular, the display zones 33a, 33b are substantially comparable in their size, their respective radial alignment differing in relation to the standing axis of the goniometer 11. Thus, for example, a display zone can be offset by 1° to the next zone (with respect to the respective radial arrangement of the zones), the respective display regions then overlapping to a relatively large proportion.

Using such a display, the provided information can be displayed so that the display direction relative to the fixed base is substantially continuous within a limited user field of vision, in particular substantially continuous in a fixed user direction. Through "travelling" of the information on the display screen which is thus achievable, the impression can be generated for the user that the information is always output in a fixed direction—in the scope of the respective display screen resolution—independently of the angular position of the structure.

In particular one advantage of the goniometer according to the invention is that the user, during an initialization process required for determining the north direction can always receive the information required for this purpose output within his field of vision, in spite of a rotation of the goniometer 11, and therefore does not have so reposition himself to the device or to the user interface of the device, respectively, according to the rotational angle.

To find north and therefore to initialize or reference the device, at least two, in particular three measurements must be carried out using a gyroscope arranged in the goniometer 11. For this purpose, the goniometer 11 must be moved into a respectively different suitable alignment, which is predefined by the device, per measurement. This alignment is typically carried out manually by a user. To guide the user through the initialization procedure, information is displayed to him by means of the display screen 35. The user thus sees the initialization information independently of the angular position of the goniometer 11 and can accordingly perform the north referencing of the device simply.

In a special application, an operator of a goniometer 11 according to the invention can, for example, set up the tripod 16 in a strategically favourable location and position goniometer 11 and observation device 18 thereon. The initialization of the system 10 can subsequently be performed, in that the operator carries out the first measurement in the setup position and subsequently places the goniometer 11 in a second and third measuring position. The operator, e.g., during a military operation, can maintain his position behind the goniometer 11, i.e., facing away from unknown or enemy terrain, until the goniometer 11 is ready to function. Aiming at an enemy target, e.g., a tank, can then be performed by the observation device and therefore its position can be exactly determined.

Information thus generated can be used further for an attack on the target, for example.

Figure 5:
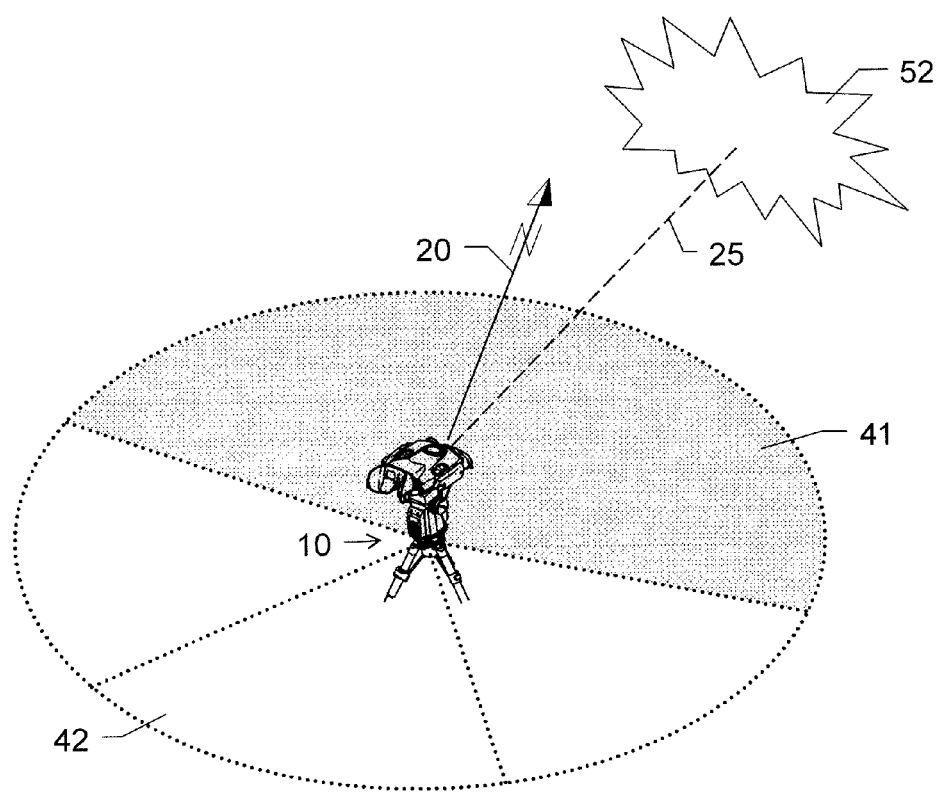
FIG. 5 shows aiming at an object using a system according to the invention made of goniometer and observation device.

FIG. 5 shows an embodiment for a system 10 according to the invention made of goniometer and observation device having tripod. By means of a gyroscope (not shown), a north direction 20 has been determined in this case after setup of the goniometer, the goniometer being pivotable with the aid of three display zones (not shown here), which are each arranged offset by 90° on the structure, into the respective measuring positions predefined for this purpose. In addition, by means of a laser beam 25, a target 52 is aimed at and a distance to the target 52 is determined. The alignment of the observation device is determined according to the method described for FIG. 4. An exact position determination of the target 52 can thus be carried out by the combination of the known device alignment and the distance measurement.

An aiming angle range 41 and a user angle range 42 are defined relative to the base or to the tripod of the system 10. The ranges 41, 42 can remain fixed independently of the orientation of the observation device or the goniometer, respectively, with respect to alignment, and angle opening range. In this context, the aiming angle range 41 can face towards an object, e.g., an enemy, the display zones whose radial alignment lies within the aiming angle range 41 being deactivated in a manner controlled by a control and analysis unit or no information being displayed by means of these zones, respectively. In particular, the information display means on the goniometer can be controlled as a function of the angular position so that information is only provided on the display zones whose radial alignment—in the scope of an angle comparison—lies within the user angle range 42.

Through such a control of the information display means, for example, a perception of the goniometer by an enemy because of the illuminated display can be prevented or suppressed. A direct and uninterrupted sight connection between an active display zone (i.e., a display zone displaying information) and an object located in the aiming angle range 41 can be prevented by the shutdown of individual display zones within the aiming angle range 41.

It is obvious that these illustrated figures only schematically illustrate possible exemplary embodiments. The various approaches can also be combined according to the invention with one another and with devices and methods for surveying and/or aiming at objects of the prior art.

What is claimed is:

1. A goniometer, in particular for receiving an observation device and for determining its azimuth angle, having at least one base, which defines a standing axis,
a structure, the structure being rotatable around the standing axis relative to the base,
an angle encoder for determining an angular position of the structure relative to the base, and
a control and processing unit,
wherein
the structure has a graphic electronic information display means having at least two display zones for displaying user guidance; and/or measuring information,
a first of the at least two display zones of the information display means being arranged in a first radial alignment relative to the standing axis on the structure
a second of the at least two display zones of the information display means being arranged in a second radial alignment, which is different from the first radial alignment, relative to the standing axis on the structure, the first radial alignment and the second radial alignment enclosing an angle of at least 90°, and
the at least two display zones being automatically individually activated by the control and processing unit as a function of a fulfillment of a defined angular position criterion by a current angular position.

2. The goniometer according to claim 1,
wherein at least one of the display zones is turned on or off upon fulfillment of the angular position criterion.

3. The goniometer according to claim 1,
wherein upon a startup of an initialization procedure, a user angle range; and/or an aiming angle range is defined by an angular position of the structure relative to the base which is present upon starting,
only the display zones whose radial alignments lie within the user angle range displaying the user guidance information, and/or
at least one of the display zones is turned on or off in a manner controlled by the control and analysis unit as a function of a comparison of the current angular position of the structure to the aiming angle range.

4. The goniometer according to claim 1,
wherein at least one of the display zones is turned off in a manner controlled by the control and analysis unit if an angle threshold value associated with the radial alignment of the at least one display zone is exceeded because of a change of the angular position of the structure (12).

5. The goniometer according to claim 1,
wherein the structure has an at least partially polygonal footprint and the at least two display zones are respectively arranged on a face of the structure connecting each two corners.

6. The goniometer according to claim 1,
characterized in that the structure has an at least partially elliptical footprint and the at least two display zones are arranged on an outer lateral surface of the structure corresponding to the elliptical footprint.

7. The goniometer according to claim 1,
wherein the information display means is implemented in a dimensioning enclosing the structure along the outer lateral surface of the structure, in particular in a ring shape.

8. The goniometer according to claim 1,
wherein the goniometer additionally has a third display zone, a user side being defined by the arrangement of the first display zone in the first radial alignment on the structure and the second and third display zones each being arranged offset by at least 90° to the first display zone on the structure, in particular offset by 120°.

9. The goniometer according to claim 1,
wherein the structure has a swivel joint, which defines an inclination axis, the inclination axis being perpendicular to the standing axis, in particular a further angle encoder for determining an inclination angle being assigned to the swivel joint.

10. The goniometer according to claim 1,
wherein the structure has a receptacle for fastening an observation device.

11. A system made of a goniometer having at least
one base, which defines a standing axis,
a structure, the structure being rotatable around the standing axis relative to the base, and
an angle encoder for determining an angular position of the structure relative to the base,
and an observation device, which is placed on the structure in a defined position and angle relationship, for targeting a target, the observation device
being pivotable around the standing axis and in particular around an inclination axis and
having a distance measurement functionality,
in particular the observation device being modularly fastenable on the structure,
wherein the system has a graphic electronic information display means having at least two display zones for displaying user guidance information and/or measuring information,
a first of the at least two display zones of the information display means being arranged in a first radial alignment relative to the standing axis on the structure or on the observation device,
a second of the at least two display zones of the information display means being arranged on the structure or on the observation device in a second radial alignment, which is different from the first radial alignment, relative to the standing axis, the first radial alignment and the second radial alignment enclosing an angle of at least 90°, and the at least two display zones being automatically individually activated by a control and processing unit as a function of a fulfillment of a defined angular position criterion by a current angular position.

12. The system according to claim 11, wherein the goniometer is refined according to claim 2.

13. An initialization method for alignment determination of a goniometer, the goniometer having a base, which defines a standing axis, a structure rotatable around the standing axis relative to the base, and having a setup and coarse horizontal levelling of the goniometer, a determination of an angular position of the structure relative to the base, in particular an azimuth angle, and a graphic display of user guidance information, wherein a user angle range is defined upon a startup of the initialization procedure or by a defined alignment of the base, the alignment determination is performed by at least two alignment measurements in at least two different initialization angular positions of the structure relative to the base, to reach the respective initialization angular positions, the graphic display of the user guidance information is performed automatically controlled in at least two radial alignments in such a manner that the user guidance information is only displayed in the radial alignments whose directions lie within the user angle range, and the at least two radial alignments enclose an angle of at least 90°.

14. The initialization method according to claim 13, wherein a north direction is derived by means of the at least two alignment measurements.

15. The initialization method according to claim 13, wherein the alignment measurement is performed in three initialization angular positions in the scope of the initialization procedure and a quality value for the derived north direction is determined.

* * * * *